United States Patent
Genda (10) Patent No.: US 9,536,183 B2
(45) Date of Patent: Jan. 3, 2017

(54) IMAGE PROCESSING DEVICE AND IMAGE PROCESSING METHOD

(71) Applicant: Konica Minolta, Inc., Tokyo (JP)

(72) Inventor: Daisuke Genda, Kawasaki (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 13/768,716

(22) Filed: Feb. 15, 2013

(65) Prior Publication Data

US 2013/0215436 A1 Aug. 22, 2013

(30) Foreign Application Priority Data

Feb. 21, 2012 (JP) ................................ 2012-034774

(51) Int. Cl.
*G06T 5/30* (2006.01)
*G06K 15/02* (2006.01)

(52) U.S. Cl.
CPC ....... *G06K 15/1869* (2013.01); *G06K 15/1871* (2013.01); *G06K 15/1873* (2013.01)

(58) Field of Classification Search
CPC .......................... G06T 7/0085; H04N 1/40093
USPC ................................. 358/1.9, 1.15, 3.27, 300
See application file for complete search history.

(56) References Cited

U.S. PATENT DOCUMENTS

| | | | | |
|---|---|---|---|---|
| 5,122,884 A * | 6/1992 | Gilbert | ................... | G06K 15/02 347/251 |
| 8,279,483 B2 * | 10/2012 | Kubo | ................. | H04N 1/40068 358/1.2 |
| 8,593,695 B2 * | 11/2013 | Tabata | ...................... | G06T 5/30 358/3.27 |
| 2001/0026295 A1 * | 10/2001 | Takahashi | ............ | B41J 2/04525 347/14 |
| 2004/0190029 A1 * | 9/2004 | Rombola | ............. | G06K 15/128 358/1.9 |
| 2004/0196480 A1 * | 10/2004 | Foster | .................... | G06K 15/02 358/1.9 |
| 2005/0073723 A1 * | 4/2005 | Takano | ................. | G06T 7/0083 358/2.1 |
| 2005/0219583 A1 * | 10/2005 | Foster | .................... | G06K 15/12 358/1.9 |

(Continued)

FOREIGN PATENT DOCUMENTS

| | | |
|---|---|---|
| JP | 2005-341249 | 12/2005 |
| JP | 2009-211376 | 9/2009 |

*Primary Examiner* — Akwasi M Sarpong
(74) *Attorney, Agent, or Firm* — Osha Liang LLP (57) ABSTRACT

An image forming device includes: a rasterizing section, a resolution converting section and a thinning section. The rasterizing section generates, by rasterization, image data having any one of standard resolution, resolution higher than the standard resolution and resolution lower than the standard resolution. The resolution converting section converts the resolution upon rasterization for the generated image data having the higher or lower resolution than the standard resolution into the standard resolution. The thinning section thins the image data having the standard resolution. When thinning the image data of which the resolution is converted higher than upon rasterization in the resolution converting section, the thinning section adjusts thinning strength to become larger upon thinning than when thinning the image data of which the resolution upon rasterization is kept as it is.

8 Claims, 10 Drawing Sheets

(56) References Cited

U.S. PATENT DOCUMENTS

| | | | | |
|---|---|---|---|---|
| 2008/0165376 A1* | 7/2008 | Tomohiro | ............ | G06T 7/0085 358/1.9 |
| 2009/0225335 A1* | 9/2009 | Kubo | ................ | H04N 1/40068 358/1.9 |
| 2009/0237725 A1* | 9/2009 | Hamaguchi | ........ | H04N 1/00222 358/1.15 |

* cited by examiner

| 0 | 1 | 2 |
|---|---|---|
| 3 | 4 | 5 |
| 6 | 7 | 8 |

FIG.4

IN A CASE OF 1200 dpi

↓ THINNING

: PIXEL VALUE OF 0%

: PIXEL VALUE OF 100%

FIG.5

IN A CASE OF 600 dpi

42 μm g21

↓ RESOLUTION CONVERSION g22

CONVENTIONAL THINNING g23

THINNING OF THIS EMBODIMENT g24

☐ : PIXEL VALUE OF 0%

▨ : PIXEL VALUE OF 100%

FIG.6

IN A CASE OF 1200 dpi

↓ THINNING

: PIXEL VALUE OF 0%

: PIXEL VALUE OF 100%

FIG. 7

IN A CASE OF 600 dpi

↓ RESOLUTION CONVERSION

CONVENTIONAL THINNING          THINNING OF THIS EMBODIMENT

☐ :PIXEL VALUE OF 0%
▨ :PIXEL VALUE OF 100%

FIG.8

IN A CASE OF 1200 dpi

21 μm g51

↓ THINNING g52

FIG.9
IN A CASE OF 600 dpi

↓ RESOLUTION CONVERSION

CONVENTIONAL THINNING

THINNING OF THIS EMBODIMENT

*FIG.10*

| P | EDGE DIRECTION |
|---|---|
| 1 | ↑ |
| 2 | ↗ |
| 3 | → |
| 4 | ↘ |
| 5 | ↓ |
| 6 | ↙ |
| 7 | ← |
| 8 | ↖ |

IMAGE PROCESSING DEVICE AND IMAGE PROCESSING METHOD

BACKGROUND OF THE INVENTION

1. Field of the Invention

This invention relates to an image processing device and an image processing method.

2. Description of Related Art

Data of a document and the like, created by a user using an application, is in a form of vector data. The vector data is converted into page description language (PDL) data upon printing, and the converted data is sent to a printer. The PDL data is then rasterized in the printer into image data of a bitmap format, and the image data is printed out.

The higher the resolution of the image data becomes upon rasterization, the higher the definition of the image becomes upon drawing. However, the amount of data increases as the resolution becomes higher, so there is a case in which resolution upon rasterization can be selected from a plurality of different values of resolution according to image processing power.

For example, when writing resolution for a printing device of a printer is 1200 dpi, and if image processing power of the device is sufficiently high, image data can be generated upon rasterization at the same resolution as that in printing, i.e. 1200 dpi. On the other hand, when the image data is generated at resolution of 600 dpi, which is lower than 1200 dpi, upon rasterization, and then the resolution of the image data is converted from 600 dpi to 1200 dpi, an amount of the image data can be reduced and hence processing time can be shortened.

In the meantime, a technique of thinning image data after rasterization is known (see Japanese Patent Application Laid-Open Publication No. 2009-211376, and Japanese Patent Application Laid-Open Publication No. 2005-341249, for example). According printing characteristics of a printer, an object such as a character tends to thicken after printing; however, the thickening of the object can be improved by the thinning process.

In the case described above, in which the resolution of the image data upon rasterization is different from that at printing, the resolution of the image data is converted into resolution at a time of printing, and then the thinning process is performed on the obtained image data thereafter.

However, when image data which has been rasterized with low resolution is converted into the one with high resolution, the image of an object becomes thicker than in a case of the image data being rasterized with original high resolution. Therefore, the size of the object after the thinning process varies depending on the resolution at which the image data is rasterized.

A user expects that an image designed using vector data to be reproduced as it is after rasterization, regardless of the resolution at which the image data is rasterized. Thus, reproduction of identical images is required regardless of the resolution at which the image data is rasterized.

SUMMARY OF THE INVENTION

The present invention aims to improve reproducibility of an image which is rasterized with different values of resolution.

According to a first aspect of the present invention, there is provided an image processing device, including: a rasterizing section for generating, by rasterization, image data having anyone of standard resolution, resolution higher than the standard resolution and resolution lower than the standard resolution; a resolution converting section for converting the resolution upon rasterization for the generated image data having the higher or lower resolution than the standard resolution into the standard resolution; and a thinning section for thinning the image data having the standard resolution, wherein when thinning the image data of which the resolution is converted higher than upon rasterization in the resolution converting section, the thinning section adjusts thinning strength to become larger upon thinning than when thinning the image data of which the resolution upon rasterization is kept as it is.

According to a second aspect of the present invention, there is provided an image processing method including: a rasterizing step for generating, by rasterization, image data having any one of standard resolution, resolution higher than the standard resolution and resolution lower than the standard resolution; a resolution converting step for converting the resolution upon rasterization for the generated image data having the higher or lower resolution than the standard resolution into the standard resolution; and a thinning step for thinning the image data having the standard resolution, wherein when thinning in the thinning step, the image data of which the resolution is converted higher than upon rasterization in the resolution converting step, thinning strength is adjusted to become larger upon thinning than when thinning the image data of which the resolution upon rasterization is kept as it is.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of an image processing device and an image processing method according to the present invention is described referring to the drawings.

Figure 1:
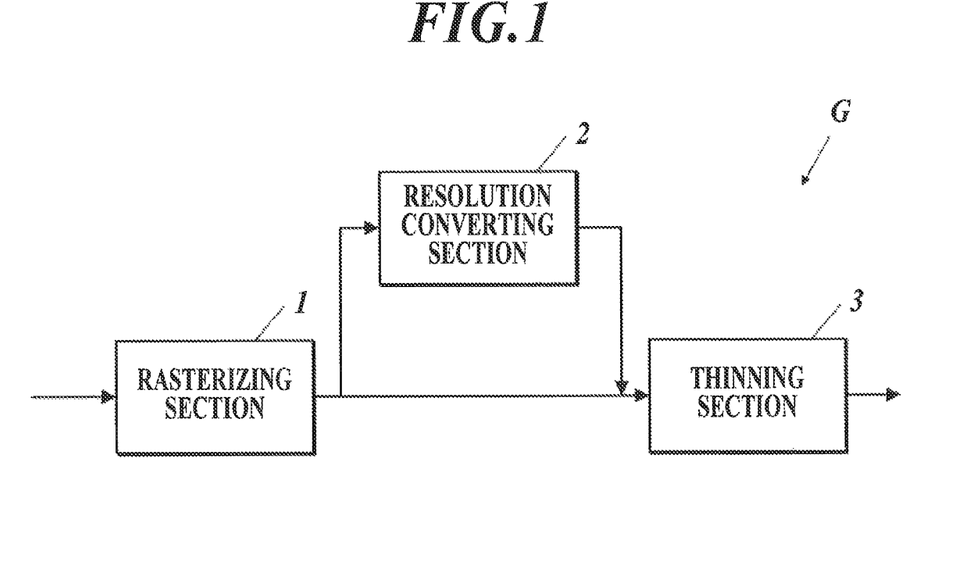
FIG. 1 is a block diagram of an image processing device according to an embodiment of the present invention.

FIG. 1 illustrates an image processing device G according to this embodiment.

The image processing device G performs rasterization (rastersizing process) to generate image data, and performs thinning (thinning process) to the generated image data to output thinned image data.

The image processing device G can be mounted onto an image forming apparatus such as a printer, a copying machine and the like, or can be installed in a printer controller for receiving page description language (PDL) data from a computer and transmitting image data to the image forming apparatus.

As shown in FIG. 1, the image processing device G includes a rasterizing section 1, a resolution converting section 2 and a thinning section 3. A configuration in FIG. 1 is an example, and an image processing section that executes image processing such as a color conversion process, a screen process and the like can also be provided.

The rasterizing section 1 rasterizes given PDL data and generates image data in a bitmap format.

Upon rasterization, the rasterizing section 1 analyzes the PDL data and creates a display list and layout information. The display list is intermediate data including information on sizes, colors, attributes and so on of an object. As the attributes of the object, there are a character (Text), a diagram (Graphic) and a photo (Image). The layout information is information that indicates positions of the objects in respective pages.

The rasterizing section 1 generates the image data for each page according to the layout information, each piece of the image data being developed into the bitmap format from each of the objects written in the display list. Further, the rasterizing section 1 generates attribute data indicating attribute of each pixel of the image data, based on the display list.

While standard resolution is set as a resolution at the time of outputting the image data from the image processing device G, in the rasterizing section 1, resolution of the image data at the time of developing the image data into the bitmap format can be selected from the standard resolution, resolution higher than the standard resolution or a resolution lower than the standard resolution.

The standard resolution is, for example, a resolution at the time of printing, that is a resolution at which a printing device can write or print.

For example, if the standard resolution is 1200 dpi, the rasterizing section 1 can generate the image data at any one of resolutions 1200 dpi, 2400 dpi or 600 dpi. The rasterizing section 1 may select the resolution according to the settings made by a user or a data amount of the image data.

The image data is outputted to the resolution converting section 2 if the resolution thereof differs from the standard resolution and is outputted to the thinning section 3 if the resolution thereof is equal to the standard resolution.

Among pieces of image data generated by the rasterizing section 1, the ones having the resolution higher or lower than the standard resolution are inputted to the resolution converting section 2, and then the resolution thereof is converted to the standard resolution. For example, when the inputted image data has resolution of 600 dpi, while the standard resolution is 1200 dpi, the resolution converting section 2 converts the resolution of the image data from 600 dpi to 1200 dpi.

The resolution converting section 2 can perform smoothing to the image data simultaneously with the resolution conversion when converting the resolution of the image data into higher resolution than the resolution upon rasterization.

Upon smoothing, the resolution converting section 2 detects an edge portion of an object forming a specific pattern such as a diagonal line or a diagonal line structure for an image data before resolution conversion, and adds a pixel value to background pixels of the object for the image data after resolution conversion. The resolution converting section 2 can detect, by pattern matching, pixels forming the specific pattern and the background pixels to which the pixel value is to be added.

Figure 2:
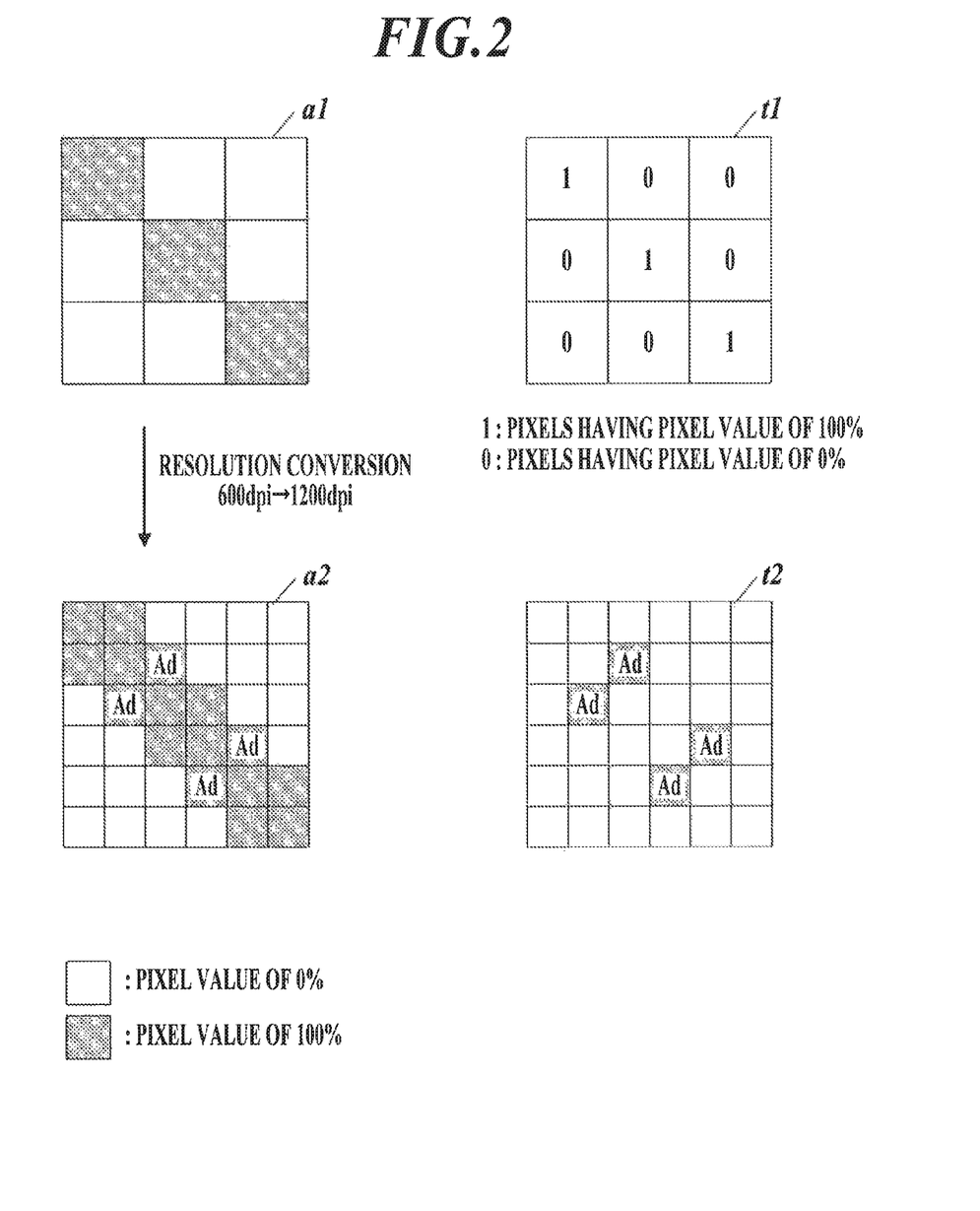
FIG. 2 illustrates processing steps in a case of performing a smoothing process simultaneously with resolution conversion.

FIG. 2 illustrates processing steps of smoothing which is performed simultaneously with resolution conversion.

The resolution converting section 2 converts a binary image a1 having resolution of 600 dpi shown in FIG. 2 into an image having resolution of 1200 dpi. Specifically, the resolution converting section 2 divides each pixel of the image a1 into four and allocates an original pixel value to each of the divided four pixels.

Hereinafter, the pixel value is represented by a ratio (%) with respect to a range of the pixel value. For example, when the range of the pixel value is 0 to 255, the pixel value of 100% represents the pixel value 255, the pixel value of 50% represents the pixel value 126, and the pixel value 0% represents the pixel value 0.

Next, the resolution converting section 2 verifies the image a1 against a template group. As shown by a template t1 in FIG. 2, the template group is a set of templates in which various patterns of pixels of which pixel value is 100% or 0% are respectively defined upon forming an inclined edge in an image. In each template, the background pixels are set, to which the pixel value is respectively added corresponding to the template after resolution conversion. In a case of the template t1, a pattern t2 is corresponded thereto in which background pixels Ad are set to which the pixel value of 100% is respectively added.

If the pattern of the image a1 matches any of the patterns in the template group as a result of the verification, the resolution converting section 2 adds the pixel value to each of the background pixels corresponding to the matching template.

As the image a1 matches the template t1, the resolution converting section 2 adds the pixel value of 100% to each of pixels in the image a1 among the pixels after resolution conversion, the pixels corresponding to the pixels Ad set in the pattern t2 being correspondent to the template t1. By this, the image a1 is converted to an image a2. In the image a2, an inclination of the diagonal line is smoothly drawn by the pixels Ad.

The thinning section 3 performs thinning on the image data of the standard resolution, which is inputted from the rasterizing section 1 or the resolution converting section 2.

Upon thinning, the thinning section 3 adjusts thinning strength of the image data inputted therein after resolution of the image data being converted higher than the resolution upon rasterization in the resolution converting section 2, so that the thinning strength becomes larger than that of the image data inputted from the rasterizing section 1 of which resolution upon rasterization is kept as it is.

Hereinafter, the thinning is described specifically.

First, image data is inputted to the thinning section 3 in a unit of 3×3 pixels. The thinning section 3 determines whether or not a focus pixel positioned at the center of the unit is an edge of an object. If the pixel is the edge, the thinning section 3 also determines an edge direction of the edge. The edge direction represents a direction from a small pixel value towards a large pixel value. That, is, a direction from a background to a foreground. Contrary to the edge direction, an inverse edge direction represents a direction from the large pixel to the small pixel, that it, a direction from the foreground to the background.

Figure 3:
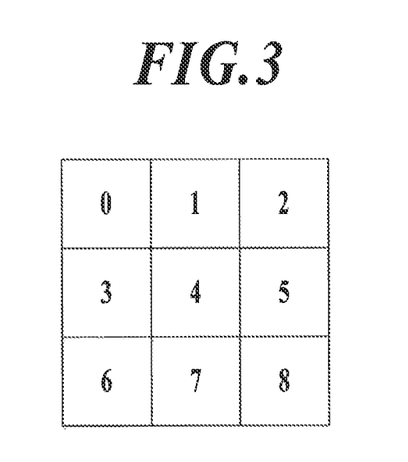
FIG. 3 illustrates 3×3 pixels.

FIG. 3 illustrates 3×3 pixels. The respective pixels are allocated with identification numbers for the respective pixels, which are 0 to 8.

The thinning section 3 calculates differences SP between the focus pixel and surrounding pixels that are adjacent to the focus pixel in upward, downward, leftward and rightward directions respectively. The differences SP between the focus pixel and the surrounding pixels can be expressed as follows.

$$SP[u]=C[4]-C[1]$$

$$SP[d]=C[4]-C[7]$$

$$SP[l]=C[4]-C[3]$$

$$SP[r]=C[4]-C[5]$$

Here, SP[u], SP[d], SP[l] and Sp [r] represent the differences between the focus pixel and the surrounding pixels which are adjacent thereto in upward, downward, leftward and rightward directions respectively. C[ ] represents a pixel value of the pixel having the identification number in a square bracket.

The thinning section 3 determines an edge direction Px of the focus pixel in the main scanning direction from the relationship between the sizes of SP [r] and SP [l], and determines an edge direction Py of the focus pixel in the sub-scanning direction from the relationship between the sizes of SP[u] and SP[d].

If SP[l]<SP[r], the thinning section 3 outputs Px=−1 showing that the edge direction is the leftward direction, and if SP[l]>SP[r], outputs Px=+1 showing that the edge direction is the rightward direction and if SP[l]=SP[r], outputs Px=0 showing that the edge direction is not present in the main scanning direction.

Likewise, if SP[u]<SP[d], the thinning section 3 outputs Py=+1 showing that the edge direction is the upward direction, and if SP[u]>SP[d], outputs Py=−1 showing that the edge direction is the downward direction and if SP[u]=SP[d], outputs Py=0 showing that the edge direction is not present in the sub-scanning direction.

If Px=Py=0, the thinning section 3 determines that the focus pixel is not the edge of the object, and outputs P=0 showing that the edge is not present therein.

The thinning section 3 determines that the focus pixel is the edge of the object, if Px≠0 or Py≠0, and defines as below the overall edge directions P according to the combination of the edge direction Px in the main scanning direction and the edge direction Py in the sub-scanning direction.

P=1 if Px=0 and Py=+1
P=2 if Px=+1 and Py=+1
P=3 if Px=+1 and Py=0
P=4 if Px=+1 and Py=−1
P=5 if Px=0 and Py=−1
P=6 if Px=−1 and Py=−1
P=7 if Px=−1 and Py=0
P=8 if Px=−1 and Py=+1

Figure 10:
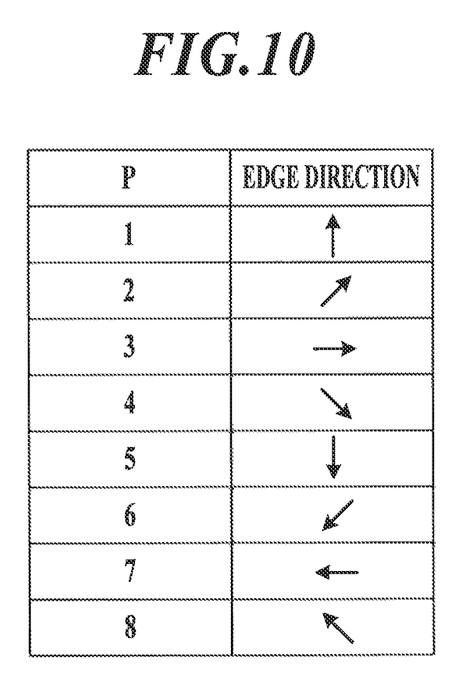
FIG. 10 shows a correspondence relationship between the value of P and the edge direction.

The table shown in FIG. 10 shows a correspondence relationship between the value of P and the edge direction, There is in total eight edge directions P, which are four directions in the upward, downward, leftward and rightward directions and four diagonal directions.

The above process is repeated for all the pixels in the image data, and determination on the presence or absence of the edge and the edge direction P is carried out for all the pixels.

Next, the thinning section 3 reduces a pixel value of the pixel determined as the edge of the object.

In a case of thinning a multivalued image, the thinning section 3 reduces the pixel value of the pixel determined as the edge (edge pixel) of the object among the pixels in the image data, by a ratio according to the thinning strength.

For example, the thinning section 3 performs interpolation between the pixel value of the edge pixel and the pixel value of the background pixel adjacent to the edge pixel concerned in the inverse edge direction, and calculates the pixel value of the edge pixel after thinning. An expression of the above process is as follows.

$$Ces(\%)=Ce\times(100-f)/100+Cpa\times f/100$$

Here, Ces represents a pixel value of an edge pixel after thinning. Ce represents an original pixel value (%) of the edge pixel. Cpa represents the pixel value (%) of a background pixel in the inverse edge direction. f is thinning strength which is represented by a ratio (%) at which the pixel value of the background pixel is included. The larger the value of f is, the greater the thinning strength is, causing the amount of the pixel value to be reduced to be larger. A range of the value f is between 0 and 100%.

Referring to FIG. 3, if the pixel of the identification number 4 is the edge pixel and the edge direction of P is 3 indicating the rightward direction, the pixel adjacent to the edge pixel concerned in the inverse edge direction is the pixel of the identification number 3. In a case of setting the thinning strength f to 70%, from the above expression for Ces, 30% of the pixel value of the pixel of the identification number 4 and 70% of the pixel value of the pixel of the identification number 3 are added, and outputted as the pixel value of the pixel of the identification number 4 after thinning. As described above, the pixel value of the pixel adjacent to the edge pixel in the inverse direction to the edge direction P, that is, the pixel value of the background pixel having a smaller pixel value than the foreground edge pixel is included in the pixel value of the foreground edge pixel. Therefore, the pixel value of the foreground edge pixel can be reduced by the ratio f.

By using a larger value f when thinning the image data of which resolution upon rasterization is converted higher than when thinning the image data of which resolution upon rasterization is not converted but kept as it is, the thinning section 3 can adjust the ratio by which the pixel value is reduced to become larger.

For example, in the thinning process of the image data of which resolution upon rasterization is kept as it is, the thinning section 3 uses the value f of 50%. On the other hand, upon thinning of the image data of which resolution upon rasterization is converted higher, the thinning section 3 uses the value f of 75%.

In contrast, in a case of thinning binary image data, a pixel value of the image data only takes either maximum of 100% or minimum of 0%. In this case, the thinning section 3 reduces the pixel value of 100% of an edge pixel of an object among the pixels of the binary image data to the minimum value of 0%.

The thinning section 3 can adjust the thinning strength of the pixel at which the pixel value is reduced to become large, by sequentially extending a thinning target from the edge pixel of the object to the pixel positioned in the edge direction.

Accordingly, when thinning the image data of which resolution upon rasterization is converted higher, the thinning section 3 can adjust the thinning strength by a larger amount by increasing the number of pixels of which the pixel value is reduced, compared to when thinning the image data of which resolution upon rasterization is kept as it is.

For example, upon thinning of the image data inputted with resolution upon rasterization kept as it is, the thinning section 3 reduces the pixel value of 100% to the minimum of 0% only for the edge pixel. On the other hand, upon thinning of the image data of which resolution upon rasterization is converted higher, the thinning section 3 reduces the pixel value of 100% to the minimum of 0% for two pixels, which are the edge pixel and the adjacent pixel in the edge direction.

As described above, the number of pixels in which the pixel value is reduced in single thinning is set to two or more, in order to adjust the thinning strength to become large. Also, the thinning strength can be adjusted to become large when the number of pixels in which the pixel value is reduced is fixed to one, and performing the thinning twice or more.

For example, with respect to the image data inputted with resolution upon rasterization kept as it is, the thinning section 3 performs the thinning once in which the pixel value of 100% is reduced to the minimum value of 0% only for the edge pixel. The thinning in the same manner is repeated twice by the thinning section 3 for the image data of which resolution upon rasterization is converted higher, reducing the pixel value for two pixels in total.

In addition, in a case in the resolution converting section 2 where the resolution of the image data is converted higher than upon rasterization and at the same time smoothing is performed thereto to add the pixel value to the respective background pixels of the object, the object region expands and thickens the object.

Therefore, when the image data of which resolution upon rasterization is converted higher, and also when the image data to which the pixel value is added upon resolution conversion is thinned, as described above, it is preferable to adjust the thinning strength larger than that of the image data which is thinned at the resolution upon rasterization being kept as it is.

In this way, the thickening of the object due to the addition of the pixel value can be corrected, thus identical images or nearly identical images can be reproduced when finally obtained, regardless of the resolution upon rasterization.

Further, regarding the image data of which resolution upon rasterization is converted higher, it is preferable that the thinning section 3 adjusts the thinning strength to become larger as the resolution of the image data upon rasterization becomes lower.

The lower the resolution of the image data when being rasterized is, the thicker the object becomes in the image data of which resolution upon rasterization is converted higher. Therefore, by adjusting the thinning strength to become larger as the resolution upon rasterization becomes lower, the thinning can be performed according to the thickness of the object. Thus, even if the resolution upon rasterization differs, the identical or nearly identical images can be reproduced when finally obtained.

For example, when thinning a multivalued image data having resolution equal to standard resolution of 2400 dpi, upon rasterization, the thinning section 3 adjusts the thinning strength f to 50%. On the other hand, when thinning image data having resolution of 1200 dpi upon rasterization and 2400 dpi after resolution conversion, the thinning section 3 adjusts the thinning strength f to 60%. Further, when thinning image data having resolution of 600 dpi upon rasterization and 2400 dpi after resolution conversion, the thinning section 3 adjusts the thinning strength f to 75%.

Moreover, influence caused by the thickening becomes the greatest when the object attribute is a character, and becomes the smallest when the object attribute is a photo.

Accordingly, the thinning section 3 may target to perform the adjustment of the thinning strength for pixels having a specific attribute data. For example, the thinning section 3 may target only the image data, of which the attribute data indicates that the attribute is a character, for adjusting the thinning strength as described above, and so on.

Hereinafter, the processing by using the above described image processing device G is described using specific examples.

Example 1

Figure 4:
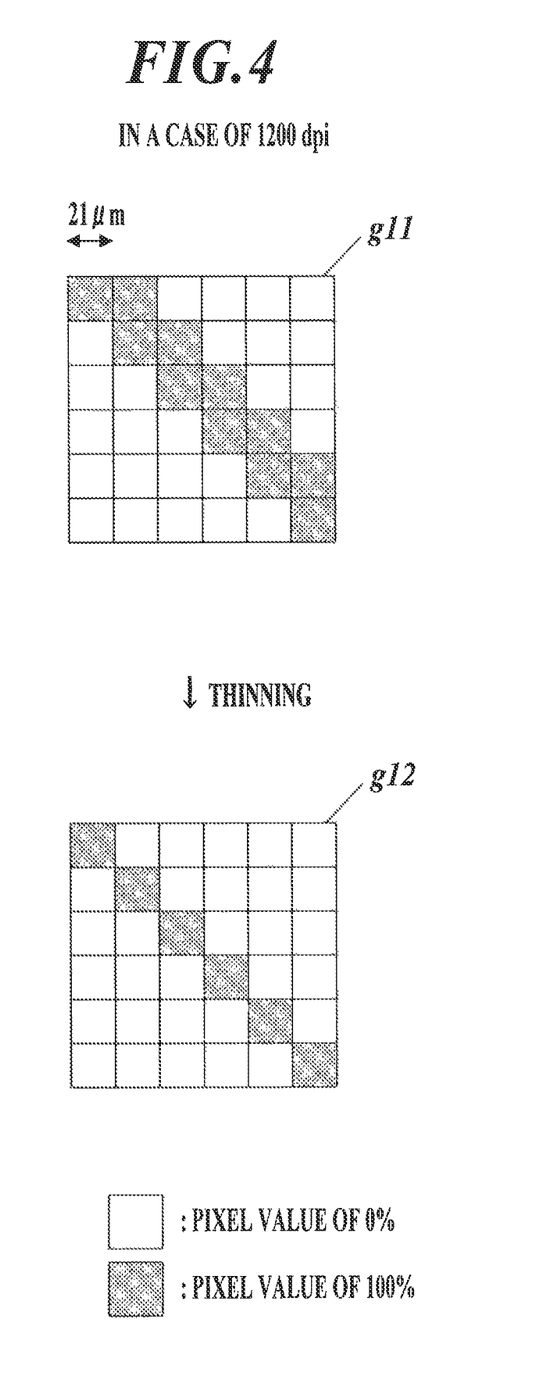
FIG. 4 illustrates processing steps for a binary image of a diagonal line rasterized at resolution of 1200 dpi.

FIG. 4 illustrates processing steps for a binary image g11 formed by rasterizing at standard resolution of 1200 dpi, an image having a 32 μm width diagonal line. When the resolution is 1200 dpi, a size of one pixel is 21 μm.

As the resolution of the image g11 is 1200 dpi, the resolution thereof is not converted but the process proceeds to thinning at the resolution upon rasterization being kept as it is.

An image g12 is the image after the image g11 is thinned and a pixel value of each of edge pixels is reduced from 100% to 0%. The width of the diagonal line is thinned from a two-pixel width to a one-pixel width.

Figure 5:
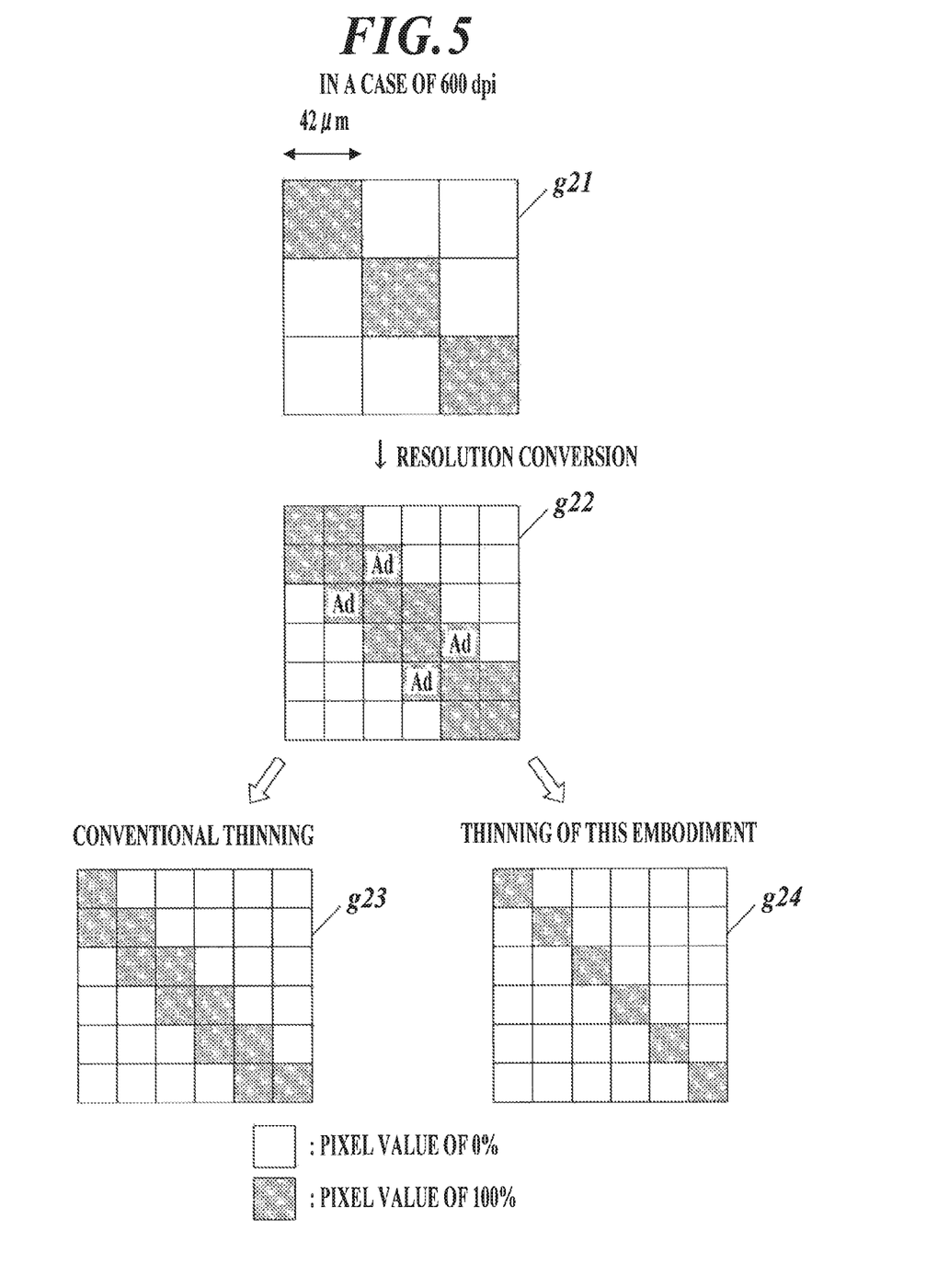
FIG. 5 illustrates processing steps for the binary image of the diagonal line which rasterized at resolution of 600 dpi.

In contrast, FIG. 5 illustrates processing steps for a binary image g21 formed by rasterizing at resolution of 600 dpi, an image having the same 32 μm width diagonal line. When the resolution is 600 dpi, a size of one pixel is 42 μm.

An image g22 is the image after the resolution of the image g21 is converted from 600 dpi to 1200 dpi. Upon the resolution conversion, the pixel value of 100% is added to each of background pixels Ad to form smooth inclination, but the diagonal line becomes thickened due to the added pixels Ad. In addition, the image g22 in which the pixel value is not added to each of the pixels Ad has a larger number of pixels used to form the diagonal line and looks thicker compared to the case in the image g11 having the resolution of 1200 dpi.

In the conventional thinning, the image g22 is thinned at the same thinning strength as in the case of the image g12, and the pixel value of each of the edge pixels is reduced from 100% to 0%. The image g23 is the resultant image after the conventional thinning, where the width of the diagonal line is thinned from a three-pixel width to a two-pixel width.

As seen from the comparison between the image g23 and the image g12, the diagonal line of the image g23 becomes thicker than that of the image g12, where the image g23 is thinned after being converted into higher resolution than upon rasterization and the image g12 is thinned at the resolution upon rasterization being kept as it is.

According to this embodiment, when thinning the image 511 inputted from the rasterizing section 1 with resolution upon rasterization being kept as it is, the thinning section 3 reduces the pixel value from 100% to 0% for only one pixel portion which corresponds to the edge pixels. On the other hand, when thinning the image g22 inputted from the resolution converting section 2 with resolution upon rasterization being converted, the thinning section 3 reduces the pixel value from 100% to 0% for two pixel portions which respectively correspond to the edge pixels and pixels adjacent to the respective edge pixels in the edge direction.

As described above, the thinning strength is adjusted so that the image g11 is processed into the image 12 as shown in FIG. 4, and the image g22 is processed into the image g24 as shown in FIG. 5. The images of the diagonal lines in the image g12 and the image g24 coincide with each other, indicating that the identical diagonal lines are reproduced regardless of the resolution upon rasterization.

Example 2

Figure 6:
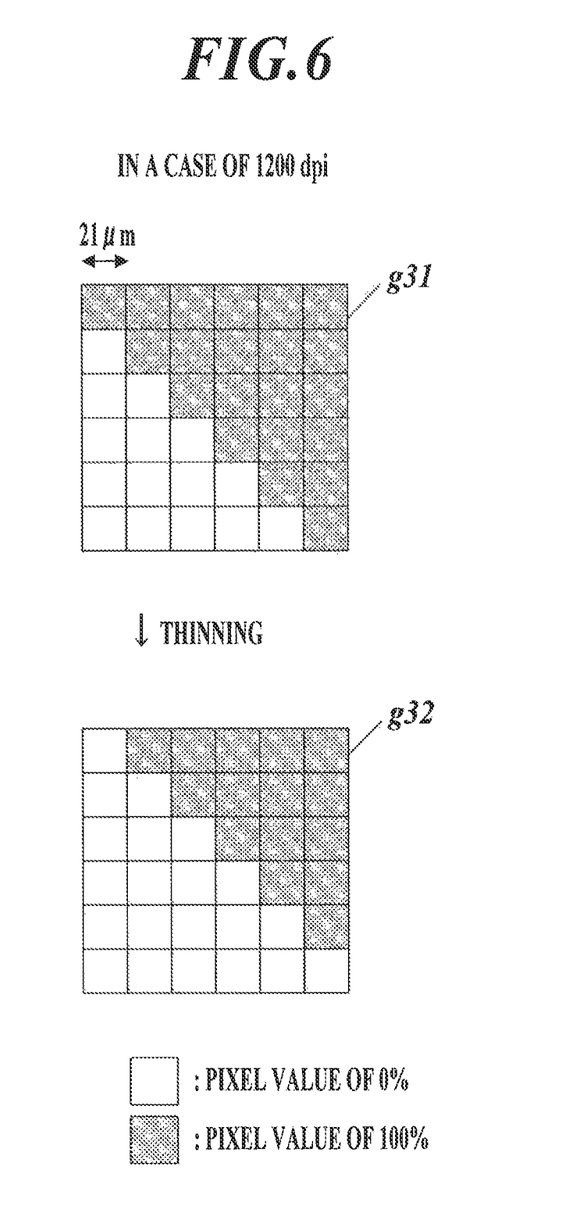
FIG. 6 illustrates processing steps for a binary image in an edge portion of an object rasterized at resolution of 1200 dpi.

FIG. 6 illustrates processing steps for an image g31 formed by rasterizing at standard resolution of 1200 dpi, an image of an edge portion of an object.

The resolution of the image g31 is the standard resolution of 1200 dpi, therefore the resolution thereof is not converted and the resolution upon rasterization is kept as it is upon thinning.

An image g32 is the image after the image g31 is thinned and a pixel value of each of edge pixels is reduced from 100% to 0%. In the object, the edge is thinned by only one pixel portion.

Figure 7:
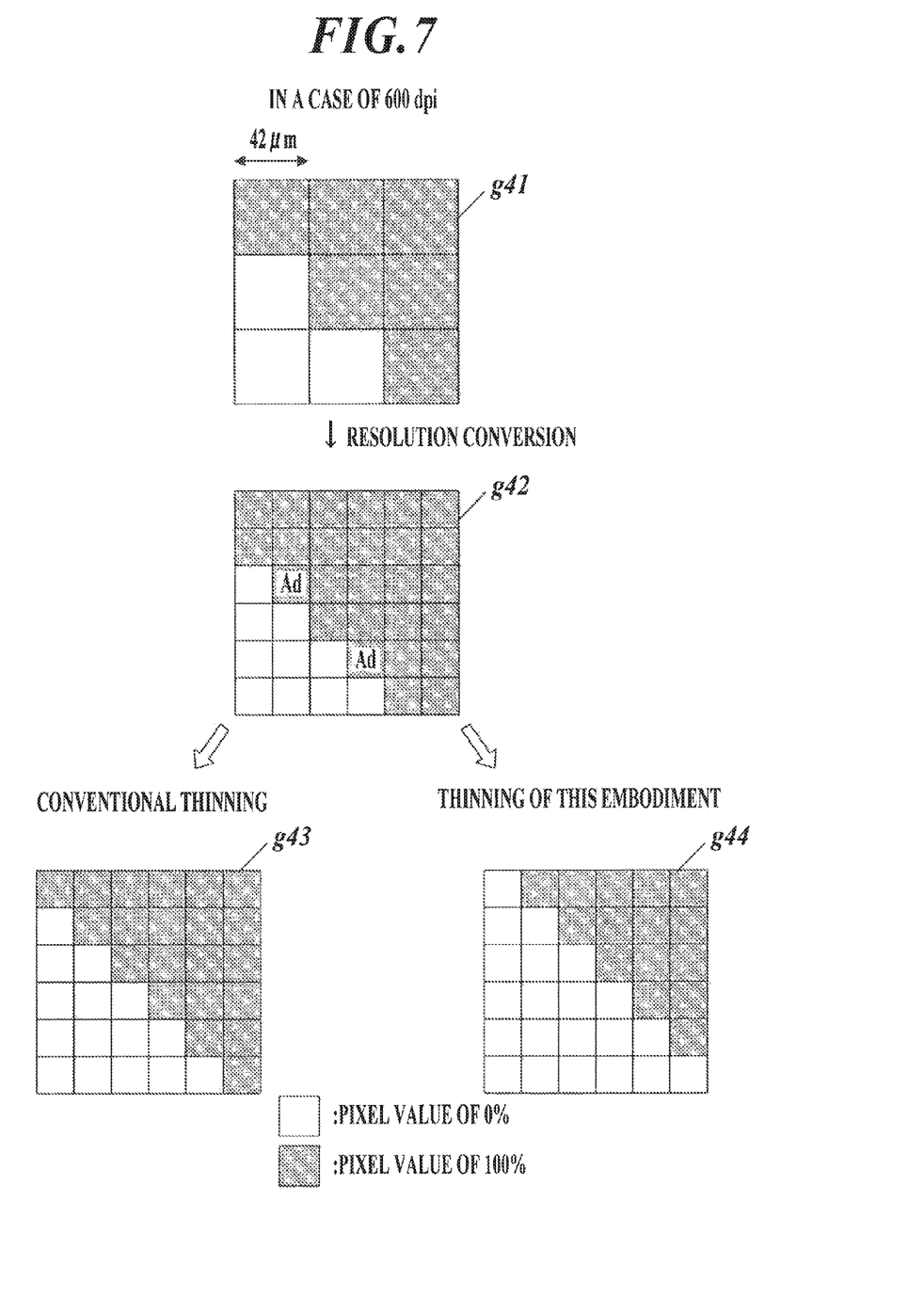
FIG. 7 illustrates processing steps for the binary image in the edge portion of an object rasterized at resolution of 600 dpi.

FIG. 7 illustrates processing steps for an image g41 formed by rasterizing at resolution of 600 dpi, an image of an edge portion of the same object.

An image g42 is the image after the resolution of the image g41 is converted from 600 dpi to 1200 dpi. Upon the resolution conversion, the pixel value of 100% is added to each of background pixels Ad to form smooth inclination, but the object becomes thickened due to the added pixels Ad. In addition, the image g42 in which the pixel value is not added to each of the pixels Ad has a larger number of pixels used to form the object and looks thicker compared to the case in the image g31 having the resolution of 1200 dpi.

In the conventional thinning, the image g42 is thinned at the same thinning strength as in the case of the image g32, and the pixel value for only one edge pixel portion is reduced from 100% to 0%. The image g43 is the resultant image after the conventional thinning.

As seen from the comparison between the image g43 and the image g32, the object of the image g43 becomes thicker than that of the image g32, where the image g43 is thinned after being converted to higher resolution than upon rasterization and the image g32 is thinned at the resolution upon rasterization being kept as it is.

According to this embodiment, when thinning the image g31 inputted from the rasterizing section 1 with resolution upon rasterization being kept as it is, the thinning section 3 reduces the pixel value from 100% to 0% for only one pixel portion which corresponds to the edge pixels. Moreover, when thinning the image 42 inputted from the resolution converting section 2 with resolution upon rasterization being converted higher, the thinning section 3 reduces the pixel value from 100% to 0% for two pixel portions which corresponds to the edge pixels and pixels adjacent to the respective edge pixels in the edge direction.

As described above, the thinning strength is adjusted so that the image g31 is processed into the image g32 as shown in FIG. 6, and the image g42 is processed into the image g44 as shown in FIG. 7. The images of the object in the image g32 and the image g44 coincide with each other, indicating that the identical objects are reproduced regardless of the resolution upon rasterization.

Example 3

Figure 8:
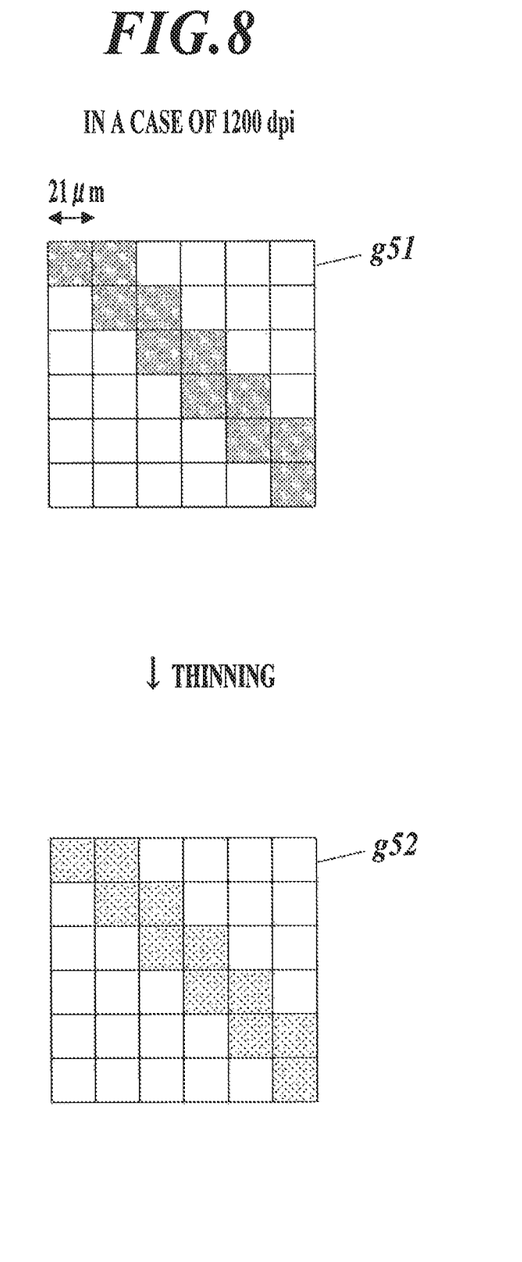
FIG. 8 illustrates processing steps for a multivalued image of the diagonal line rasterized at resolution of 1200 dpi.

FIG. 8 illustrates processing steps for a multivalued image g51 formed by rasterizing at standard resolution of 1200 dpi, an image having a 32 μm width diagonal line. A pixel value of the diagonal line is 100% and a pixel value of background thereof is 0%.

As the resolution of the image g51 is 1200 dpi, the resolution thereof is not converted but the process proceeds to thinning with the resolution upon rasterization being kept as it is.

An image g52 is the image after the image g51 is thinned and the pixel value of each of edge pixels are reduced from 100% to 50%. The diagonal line has a two-pixel width and represented as the pixel value of 200% for two pixels in the image g51, but the pixel value is halved to 100% in the image g52, reproducing thinning effect visually.

Figure 9:
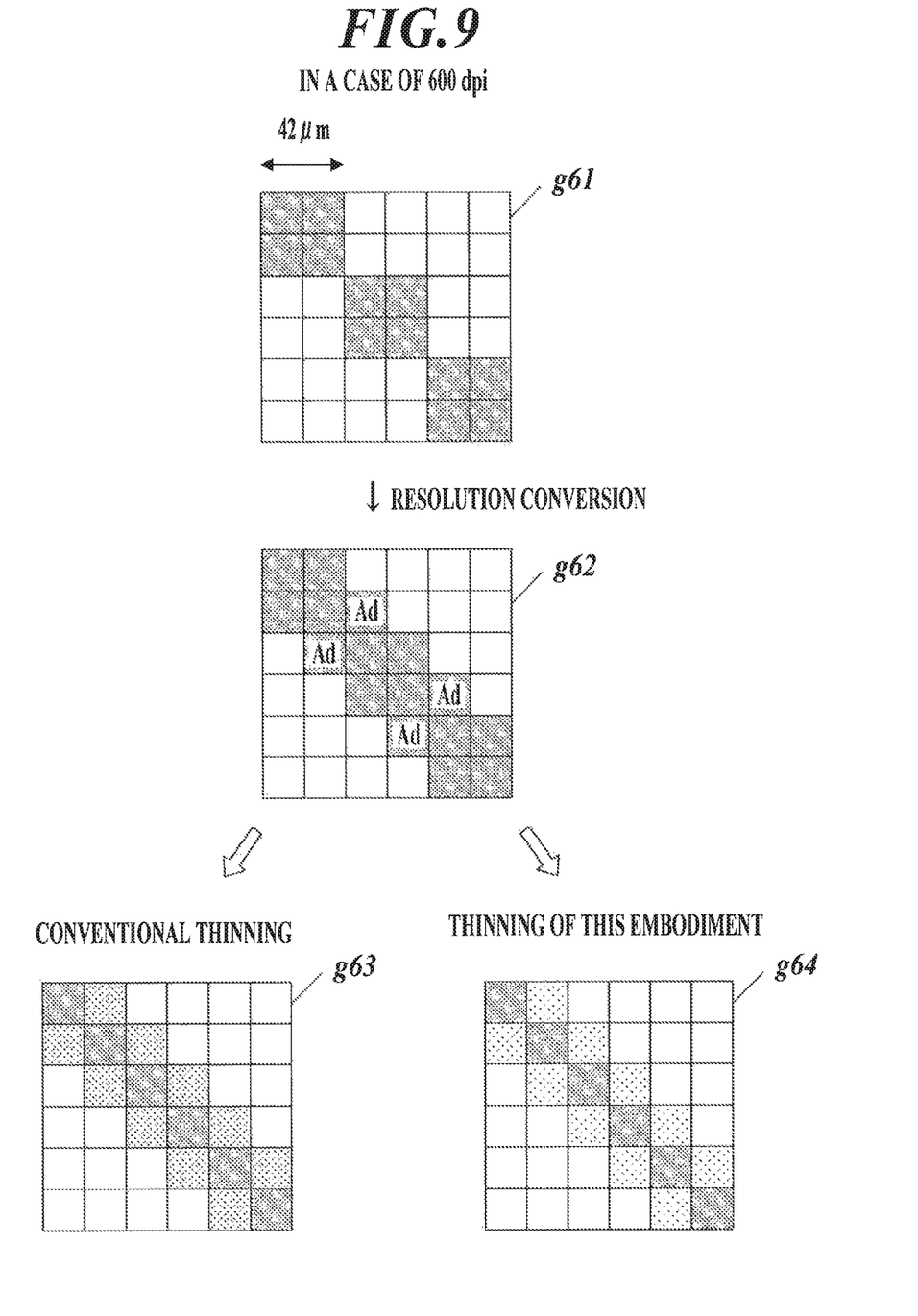
FIG. 9 illustrates processing steps for the multivalued image of the diagonal line rasterized at resolution of 600 dpi.

FIG. 9 illustrates processing steps for a multivalued image g61 formed by rasterizing at resolution of 600 dpi, an image having the same 32 μm width diagonal line.

An image g62 is the image after the resolution of the image g61 is converted from 600 dpi to 1200 dpi. Upon the resolution conversion, the pixel value of 100% is added to each of background pixels Ad to form smooth inclination, but the diagonal line becomes thickened due to the added pixels Ad.

In the conventional thinning, the image g62 is thinned at the same thinning strength as in the case of the image g52, and the pixel value of each of edge pixels are reduced from 100% to 50%. The image g63 is the resultant image after the conventional thinning. In the image g63, the width of the diagonal line has a three-pixel width, and a total pixel value of the three pixels is 200%.

As seen from the comparison between the image g63 and the image g52, the diagonal line of the image g63 uses a larger number of pixels to form the diagonal line after thinning and has the total pixel value twice as much than that of the image g52, making the diagonal line of the image q63 appear thicker than that of the image g63. Here, the image g63 is thinned after being converted into higher resolution than upon rasterization and the image g52 is thinned at the resolution upon rasterization being kept as it is.

According to this embodiment, when thinning the image g51 inputted from the rasterizing section 1 with resolution upon rasterization being kept as it is, the thinning section 3 reduces the pixel value of each of the edge pixels by 50%. Moreover, when thinning the image g62 inputted from the resolution converting section 2 with resolution upon rasterization being converted higher, the thinning section 3 reduces the pixel value of each of the edge pixels by 75%.

As described above, the thinning strength is adjusted so that the image 51 is processed into the image g52 as shown in FIG. 8, and the image g62 is processed into the image g64 as shown in FIG. 9, The diagonal line has a three-pixel width in the image g64; however, a total pixel value of the three pixels is 150% in the image g64, reproducing the diagonal line having a nearer pixel value than in the image g63.

As described above, according to this embodiment, the image forming device G includes: the rasterizing section 1 for generating, by rasterization, image data having any one of standard resolution, resolution higher than the standard resolution and resolution lower than the standard resolution; the resolution converting section 2 for converting the resolution upon rasterization for the generated image data having the higher or lower resolution than the standard resolution into the standard resolution; and the thinning section 3 for thinning the image data having the standard resolution. When thinning the image data of which the resolution is converted higher than upon rasterization in the resolution converting section 2, the thinning section 3 adjusts the thinning strength to become larger upon thinning than when thinning the image data of which the resolution upon rasterization is kept as it is.

By this way, an object, which is thickened by converting the resolution of the image data higher than upon rasterization, can be thinned more. Accordingly, the image becomes identical or nearly identical to the image which is thinned with the resolution upon rasterization being kept as it is, improving reproducibility of the images rasterized in different values of resolution.

It should be noted that the above embodiment is only a preferred example, and the present invention is not limited to the above embodiment. The embodiment can be altered without departing from the scope of the present invention.

For example, a degree of the thinning strength can be adjusted according to a result of the actual thinning.

Specifically, the rasterization section 1 rasterizes PDL data of a test pattern of an object having a diagonal line structure that tends to thicken, and generates binary image data in standard resolution and resolution lower than the standard resolution. The resolution converting section 2 converts the resolution of the image data having the lower resolution into the standard resolution. The thinning section 3 performs thinning at the same thinning strength for the image data inputted from the resolution converting section 2 with resolution being converted higher than upon rasterization, and for the image data inputted from the rasterizing section 1 with resolution upon rasterization being kept as it is. Then the two pieces of the thinned image data are compared. Regarding the image data of which resolution is converted higher than upon rasterization, if the object of the image data is thicker by two pixel portions than the other, the number of pixels by which a pixel value is reduced can be determined to be 2, as the thinning strength at the time of thinning the image data concerned.

Further, an image forming method according to the present invention may be achieved by programming a processing flow performed by each section of the above described image processing device, and the program is read and executed by hardware such as a central processing unit (CPU). As a medium storing the program and readable by a computer, a non-volatile memory such as a ROM, a flash memory and the like and a portable recording medium such as a CD-ROM can be applied. Also, a carrier wave can be used as a medium for providing program data via communication lines.

According to a first aspect of the preferred embodiment of the present invention, there is provided an image processing device G, including: a rasterizing section 1 for generating, by rasterization, image data having any one of standard resolution, resolution higher than the standard resolution and resolution lower than the standard resolution; a resolution converting section 2 for converting the resolution upon rasterization for the generated image data having the higher or lower resolution than the standard resolution into the standard resolution; and a thinning section 3 for thinning the image data having the standard resolution, wherein when thinning the image data of which the resolution is converted higher than upon rasterization in the resolution converting section 2, the thinning section 3 adjusts thinning strength to become larger upon thinning than when thinning the image data of which the resolution upon rasterization is kept as it is.

By this way, an object, which is thickened by converting resolution of image data higher than upon rasterization, can be thinned more. Accordingly, the image of the object becomes identical or nearly identical to the one which is thinned at resolution upon rasterization kept as it is, improving reproducibility of the images rasterized in different values of resolution.

Preferably, when thinning multivalued image data, the thinning section 3 reduces a pixel value of each of edge pixels of an object among the respective pixels in the image data, and adjusts a ratio at which the pixel value is reduced to become large, so that the thinning strength is adjusted to become large.

Preferably, when thinning binary image data, the thinning section 3 successively reduces a pixel value to a minimum value starting from each of edge pixels of an object towards each of pixels positioned in an edge direction, and increases a number of the pixels in which the pixel value is reduced, so that the thinning strength is adjusted to become large.

Preferably, the resolution converting section 2 detects an edge of an object forming a specific pattern in the image data before resolution conversion when converting the resolution of the image data higher than upon rasterization, and adds a pixel value to each of background pixels in the image data after resolution conversion; and the thinning section 3 adjusts the thinning strength to become large when thinning the image data of which the resolution is converted higher than upon rasterization and to which the pixel value is added upon resolution conversion.

Preferably, the thinning section 3 adjusts the thinning strength to become larger as the resolution of the image data upon rasterization becomes lower.

According to a second aspect of the preferred embodiment of the present invention, there is provided an image processing method including: a rasterizing step for generating, by rasterization, image data having any one of standard resolution, resolution higher than the standard resolution and resolution lower than the standard resolution; a resolution converting step for converting the resolution upon rasterization for the generated image data having the higher or lower resolution than the standard resolution into the standard resolution; and a thinning step for thinning the image data having the standard resolution, wherein when thinning in the thinning step, the image data of which the resolution is converted higher than upon rasterization in the resolution converting step, thinning strength is adjusted to become larger upon thinning than when thinning the image data of which the resolution upon rasterization is kept as it is.

Preferably, when thinning multivalued image data in the thinning step, a pixel value is reduced for each of edge pixels of an object among the respective pixels in the image data, and a ratio is adjusted at which the pixel value is reduced to become large, so that the thinning strength is adjusted to become large.

Preferably, when thinning binary image data in the thinning step, a pixel value is successively reduced to a minimum value starting from each of edge pixels of an object towards each of pixels positioned in an edge direction, and a number of the pixels is increased in which the pixel value is reduced, so that the thinning strength is adjusted to become large.

Preferably, in the resolution converting step, an edge of an object forming a specific pattern in the image data before the resolution conversion is detected when converting the resolution of the image data higher than upon rasterization, and a pixel value is added to each of background pixels in the image data after resolution conversion; and in the thinning step, the thinning strength is adjusted to become large when thinning the image data of which the resolution is converted higher than upon rasterization and to which the pixel value is added upon resolution conversion.

Preferably, in the thinning step, the thinning strength is adjusted to become larger as the resolution of the image data upon rasterization becomes lower.

The present U.S. patent application claims priority of Japanese Patent Application No, 2012-034774, filed on Feb. 21, 2012, according to the Paris Convention. The entire disclosure of Japanese Patent Application No. 2012-034774 including description, claims, drawings, and abstract is incorporated herein by reference in its entirety, and the Japanese Patent Application is a basis for correcting mistranslation of the U.S. patent application.

What is claimed is:

1. An image processing device, comprising:
    a central processing unit (CPU) that:
        generates, by rasterization, image data having any one of a standard resolution, a resolution higher than the standard resolution, and a resolution lower than the standard resolution;
        converts a resolution of the generated image data into the standard resolution, when the image data has the resolution higher or lower than the standard resolution; and
        thins the image data having the standard resolution, wherein
    when thinning the image data whose resolution has been converted into the resolution higher than the resolution at a time of rasterization, the CPU makes a thinning strength larger than a thinning strength in a case of thinning the image data whose resolution has not been converted,
    the CPU detects an edge of an object forming a specific pattern in the image data before resolution conversion when converting the resolution of the image data higher than upon rasterization, and adds a pixel value to each of background pixels in the image data after resolution conversion; and
    the CPU makes the thinning strength larger when thinning the image data whose resolution has been converted higher than upon rasterization and to which the pixel value is added upon resolution conversion.

2. The image processing device according to claim 1, wherein
    when thinning multivalued image data, the CPU reduces a pixel value of each of edge pixels of an object among the respective pixels in the image data, and makes a ratio at which the pixel value is reduced larger, so that the thinning strength is made larger.

3. The image processing device according to claim 1, wherein
    when thinning binary image data, the CPU successively reduces a pixel value to a minimum value starting from each of edge pixels of an object towards each of pixels positioned in an edge direction, and increases a number of the pixels in which the pixel value is reduced, so that the thinning strength is made larger.

4. The image processing device according to claim 1, wherein
    the CPU makes the thinning strength larger as the resolution of the image data upon rasterization becomes lower.

5. An image processing method comprising:
    generating, by rasterization, image data having any one of a standard resolution, a resolution higher than the standard resolution, and a resolution lower than the standard resolution;
    converting a resolution of the generated image data into the standard resolution, when the image data has the resolution higher or lower than the standard resolution; and
    thinning the image data having the standard resolution, wherein
    when thinning the image data, the image data whose resolution has been converted into the resolution higher than the resolution at a time of rasterization by the converting of the resolution, a thinning strength is made larger than a thinning strength in a case of thinning the image data whose resolution has not been converted,
    the converting of the resolution comprises detecting an edge of an object forming a specific pattern in the image data before the resolution conversion when converting the resolution of the image data higher than upon rasterization, and adding a pixel value to each of background pixels in the image data after resolution conversion; and
    the thinning of the image data comprises making the thinning strength larger when thinning the image data whose resolution has been converted higher than upon rasterization and to which the pixel value is added upon resolution conversion.

6. The image processing method according to claim 5, further comprising:
    when thinning multivalued image data in the thinning of the image data, reducing a pixel value for each of edge pixels of an object among the respective pixels in the image data, and making a ratio larger at which the pixel value is reduced, so that the thinning strength is made larger.

7. The image processing method according to claim 5, further comprising:
    when thinning binary image data in the thinning of the image data, successively reducing a pixel value to a minimum value starting from each of edge pixels of an object towards each of pixels positioned in an edge direction, and increasing a number of the pixels in which the pixel value is reduced, so that the thinning strength is made larger.

8. The image processing method according to claim 5, wherein
    the thinning of the image data further comprises making the thinning strength larger as the resolution of the image data upon rasterization becomes lower.

* * * * *